United States Patent [19]

Doheny, Jr.

[11] Patent Number: 5,063,005
[45] Date of Patent: Nov. 5, 1991

[54] PREPARING HEAT SHRINKABLE WRAPS

[75] Inventor: Anthony J. Doheny, Jr., Natick, Mass.

[73] Assignee: The Kendall Company, Mansfield, Mass.

[21] Appl. No.: 445,505

[22] Filed: Dec. 4, 1989

Related U.S. Application Data

[63] Continuation-in-part of Ser. No. 170,177, Mar. 18, 1988, abandoned.

[51] Int. Cl.$^5$ ............................................. B29C 35/10
[52] U.S. Cl. ...................................... 264/22; 156/85; 156/86; 156/244.17; 264/171; 264/210.2; 264/175; 264/230; 264/288.8; 264/289.3; 264/289.6; 264/342 R
[58] Field of Search ...................... 264/22, 209.6, 230, 264/342 R, 175, 171, 288.8, 289.3, 289.6, 210.2; 156/84–86, 244.17

[56] References Cited

U.S. PATENT DOCUMENTS

| | | | |
|---|---|---|---|
| 2,631,954 | 3/1953 | Bright | 264/175 |
| 3,144,399 | 8/1964 | Rainer et al. | 264/22 |
| 3,886,056 | 5/1975 | Kitamaru et al. | 264/22 |
| 3,949,110 | 4/1976 | Nakajima et al. | 264/22 |
| 3,988,399 | 10/1976 | Evans | 264/22 |
| 4,001,065 | 1/1977 | Penneck et al. | 264/230 |
| 4,348,438 | 9/1982 | Canterino | 264/22 |
| 4,469,742 | 9/1984 | Oberle et al. | 264/22 |
| 4,521,470 | 6/1985 | Overbergh et al. | 156/85 |

Primary Examiner—Jeffery Thurlow
Attorney, Agent, or Firm—M. Maus

[57] ABSTRACT

Novel processes for preparing a heat shrinkable film by first forming a polyolefinic film on a three-roll calender in which the second and third rolls rotate at about the same speed and the first roll rotates at a slower speed, the top roll is heated to a temperature above the melting point of the polyolefinic material, the middle roll is heated to an elevated temperature below its melting point, and the bottom roll is chilled relative thereto; thereafter subjecting one surface of the resulting film to irradiation from a low energy electron beam at a voltage such that the irradiation dose at the half-depth of the film is approximately one-half the dose at the irradiated surface and at a current to film surface speed ratio such that the surface dose would effect crosslinking sufficient to impart to said film a 100% modulus at 150° C. of from about 10 to about 100 pounds per square inch, if the dose at any depth in the film were substantially equal to the surface dose; and then subjecting the opposed surface of the film to irradiation from a low energy beam at a voltage and at a current to speed ratio substantially equal to that in the preceding step, such that the 100% modulus at 150° C. of the film as a whole is about 10 to about 100 pounds per square inch and the film is characterized as being substantially uniformly crosslinked throughout its thickness.

17 Claims, No Drawings

PREPARING HEAT SHRINKABLE WRAPS

BACKGROUND OF THE INVENTION

This application is a continuation in part of copending U.S. application Ser. No. 170,177 filed Mar. 18, 1988, now abandoned.

The present invention relates to heat shrinkable films and to adhesive tapes having a heat shrinkable backing. More particularly, it relates to heat shrinkable pipewraps, e.g. for protecting from environmental forces and stresses the joints or welds of pipelines such as those contemplated for inground implantation.

The concept of preparing heat shrinkable films is per se well known and the patent literature is replete with references thereto. In general, the prior procedures include the steps of crosslinking, e.g. chemically or by irradiation, and stretching to orient. The use of so-called shrinksleeves or heat shrinkable films and tapes for pipejoints or other tubular articles is also well known in the art.

While not intended to be construed to be a comprehensive survey of the art, the following patents are nevertheless considered to be illustrative.

U.S. Pat. No. 3,022,543 relates to a shrinkable film for packaging foodstuffs produced by the steps of: (1) stretching a polymer such as polyethylene above room temperature in at least one direction; (2) cooling to at least room temperature; (3) irradiating, preferably with electrons at a specified dosage; (4) heating the irradiated film to a temperature where it will soften sufficiently to stretch; (5) bilaterally stretching to orient the polymer at this elevated temperature; and (6) cooling while under tension.

U.S. Pat. No. 3,144,398 relates to the preparation of irradiated polyethylene which can be readily changed from a stretched to a shrunken condition. The objectives are said to be accomplished by cold stretching the polyethylene at a temperature of 65° C., and then irradiating at a specified dosage, preferably with electrons.

U.S. Pat. No. 3,144,399 relates to an irradiated, biaxially oriented polyethylene stretched at least 100% in each direction and below the break limit. The polyethylene is first irradiated at a specified at a specified dosage, then heated to or beyond its transparent point, and stretched to orient. The stretched condition is maintained while cooling to room temperature.

U.S. Pat. No. 3,455,337 relates to a differentially irradiated crosslinked polymeric heat recoverable article, tubing being particularly disclosed, characterized by containing a sufficient crosslink density near one surface to be substantially infusible and containing a gradual decreasing density of crosslinking throughout its thickness, the opposed surface being substantially non-crosslinked. As is described therein, the article is formed by first subjecting it to a dosage of irradiation insufficient to render the opposed surface infusible. Once the tubing has been differentially crosslinked, it is heated and subjected to differential pressure between the inside and the outside, the pressure being sufficient to cause the tube to expand in a controlled fashion.

U.S. Pat. No. 3,886,056 has for its objective to prepare from polyethylene having a high crystallinity a polyethylene having highly raised melting and softening temperatures, improved transparency and excellent dimensional stability at high temperatures. This objective is said to be accomplished by irradiating with a dosage of 0.2-16 Megarads to produce a crosslinked polyethylene having a gel content of at least one weight percent; extending the crosslinked polymer in at least one direction at a temperature of at least the anisotropic melting point; and then cooling.

U.S. Pat. No. 3,949,110 discloses a method a method of making a heat shrinkable tubing including the steps of irradiating the tube, heating is at least the softening temperature, partially inflating, and then thermosetting by cooling.

U.S. Pat. No. 3,988,399 relates to heat recoverable wraparound sleeves for pipejoints, cables, wire splices and the like which possess the ability to curl in involute fashion upon the application of heat. As is disclosed, for example, in Col. 6, one or both of the primary exterior faces can be coated with a suitable adhesive.

U.S. Pat. No. 4,348,438 discloses a process for preparing shrink wraps from a homopolymer of ethylene or a copolymer of ethylene with up to 20 weight percent of one or more other monomers. As disclosed, the film is uniaxially cold-oriented at a temperature of at least 5° C. below the film's melting point, irradiated with ionizing radiation and sealed along a seam running perpendicular to the direction of orientation. The irradiation, which is preferably carried out before the orientation, is at a dosage of 1-20 Megarads, about 3 to 5 Megarads being stated to be preferred.

U.S. Pat. No. 4,469,742 relates to a multilayer cook-in shrink film comprising: (1) a specified sealing layer; (2) a shrink layer; (3) a specified adhesive layer; (4) a barrier layer; (5) another adhesive layer; and (6) an abuse layer, the respective layers being being melt bonded and irradiated to crosslink sufficient to resist delamination during use.

U.S. Pat. No. 4,517,234 relates to a flat length of heat recoverable material having integral latching means so that the material can be wrapped around cable, pipe, etc., latched and then shrunk.

U.S. Pat. No. 4,521,470 relates to a system for enclosing an object by installing consecutively or as a single article: (a) a heat-softenable adhesive; (b) a specified thermoplastic polymeric material; and (c) a heat-recoverable cover, and thereafter heating to cause recovery (shrink).

U.S. Pat. No. 4,590,020 teaches an oriented high density polyethylene film having maximum crosslinking at the surfaces and minimum crosslinking inwardly. The film is prepared by crosslinking opposed surfaces by irradiation with electron rays in such a manner that the degree of crosslinking decreases from the surfaces inwardly so that the outer layer portions have gel fractions between 20-70% and the middle layer portion has a gel fraction between 0-5%; and thereafter heating and stretching to orient and produce a film between 10-50 microns. As stated in Col. 3, both sides should be irradiated with the same dosage, the penetrating power of the electron rays being properly adjusted according to the thickness by changing the applied voltage or by using a shield.

U.S. Pat. No. 4,001,065 teaches a "process of wrapping a substrate to insulate or protect it, wherein a tape comprising a cross-linked copolymer derived from an ethylenically unsaturated hydrocarbon and a carboxylic acid ester having ethylenic unsaturation is wrapped around the substrate, and subsequently shrunk. Although the tape is cross-linked, it nevertheless fuses sufficiently to bond to itself to form an integral structure. The substrate can if desired be removed, the tape serving as the inner layer to a hose."

My copending application Ser. No. 003091 filed Jan. 14, 1987, now U.S. Pat. No. 4,961,797, also relates to heat shrinkable films and tapes which may be employed as pipewraps, e.g. for protecting joints of pipelines.

As is disclosed therein, a heat shrinkable film may be prepared by (1) orientating a film of polyolefinic material by stretching in the machine direction; and, thereafter (2) irradiating a major surface of the oriented film with low energy radiation at a dosage sufficient to effect differential crosslinking, the degree of crosslinking being a function of the depthwise dosage of incident radiation, the radiation providing a differential in dosage and, in turn, a differential in crosslinking per unit throughout the thickness of the film, whereby the greatest crosslinking occurs at or near the irradiated surface, the extent of crosslinking decreasing as the distance from the irradiated surface increases, the surface of the film opposed from the irradiated surface being characterized as being substantially non-crosslinked.

It is also disclosed in my copending application that the polymeric material may be first formed into a film in accordance with the procedures disclosed in U.S. Pat. No. 2,631,954, which procedures will be described in full in the detailed description of the present invention.

In general, the present invention is directed to novel procedures for preparing calendered heat shrinkable films and tapes which provide the advantages which will be described hereinafter. It is particularly directed to providing heat shrinkable films and tapes which are useful as protective wraps for tubular metal articles such as pipes, e.g. pipelines intended for inground implantation, as well as for cables, wire splices, and the like.

While the aforementioned patents and applications address the application of irradiation to produce shrinkage, they do not teach the particular problem encountered with calendered film. Thus for example U.S. Pat. No. 4,001,065 which addresses calendered as well as non-calendered films, while teaching a shrinkwrap does not address the problem of curtailing shrinkage nor offer a solution. Moreover Penneck et al has no need to reduce shrinkage since the product is intended to stick to itself and/or a substrate. Shrinkage is desired to bring the two surfaces in contact so that the composition can allow the surfaces to stick together once contact is achieved. In sum the problem for the applicant is the solution to Penneck, namely to avoid the wrinkling or puckering which is precisely what Penneck seeks to obtain. Consequently it is a primary objective of the present invention to produce a commercially useful heat-shrinkable film from a calendered film. The invention will accordingly be discussed in detail hereinafter with reference to pipewraps, a primary object of this invention.

As alluded to above, it is well known in the art to provide an overwrap for pipelines in order to protect them from degradative stresses and forces after placement in the ground. An efficacious protective wrap of this description will in general comprise a rubber-based adhesive on the pipe surface and an outer corrosion and weather resistant film overlying the adhesive layer. Typically, this is accomplished by a protective adhesive wrap comprising a rubber-based adhesive carried on a polyolefinic film backing. Optionally, a primer coating may first be applied to the pipe surface in order to increase adhesion.

It would be most desirable to provide a so-called shrinkwrap of this description to insure complete adhesion of the tape to the pipe and thus avoid problems such as spiral void, as will be discussed in more detail hereinafter. However, prior systems for providing a polyethylene or other polyolefinic shrinkwrap have proved inadequate for various reasons.

As is well known, a polyolefinic film which has been oriented by stretching in the machine direction will shrink when heated above its crystalline melting point; due to the relaxation of the orientation. However, this concept is not in itself practical for preparing shrinkwraps for pipes. The film backing for the adhesive will have no equilibrium or "rubbery" modulus above its melting point to generate the stresses necessary for adhesive flow. Accordingly, the tape will pull itself apart when it shrinks against a constraint, e.g. a pipe joint.

For example, a blend of a high and a low density polyethylene such as the backing on a "980" adhesive tape (trade designation of The Kendall Company, assignee of the instant invention), comprising a high density (HDPE): low density (LDPE) polyethylene blend, will begin to shrink when heated above the low density peak, but it will maintain some strength if the shrink temperature is below the melting point of the HDPE. This could in theory be useful if the shrink temperature could be controlled to a narrow range of about 10°–15° C. between the two melting endotherms. However, this is not viable in contemplated commercial applications of heat to shrink the film.

It is also known that crosslinking will impart strength above the melting point of the polyolefinic film. For instance, a method of imparting strength to the polyethylene above its melting point(s) is to crosslink so that the film's 100% modulus at 150° C. is between 10 and 100 pounds per square inch (psi). This has not previously been attractive for commercial production, since the uniform crosslinking of the thick polyethylene which would be utilized requires very high energy electron beams for the irradiation which in turn would be both expensive and require considerable manufacturing floor space for radiation shielding.

Moreover, none of the known methods of producing a shrinkwrap by use of irradiation are effective for calendered films. Calendered films as opposed to uncalendered films, present unique problems. The major problem being the extreme shrinkability imparted by the calendering process which needs to be reduced so as to produce a commercially useful heat shrinkable film. Notably the problem of extreme shrinkage inherent in a calendered film is maximized in that the extreme shrinkage is not uniform but results in puckering and deformation in the width direction and extreme shrinkage in the longitudinal direction which negates application to flat surfaces. This problem is particularly deleterious when wrapping pipes, applicant's preferred embodiment, since tight wrapping is required to prevent corrosion. Thus the primary task of the present invention is to reduce shrinkage so as to produce a flat sheet-like film for easy application. More specifically, applicant's task is to produce a heat shrinkable film which usefully shrinks in the longitudinal direction without wrinkle-producing expansion in the width. In other words to achieve a balance between moderate longitudinal shrink and very little width expansion.

A primary object of this invention, accordingly, is to provide a calendered heat shrinkable polyolefin film which either carries an adhesive layer, i.e. in the form of an adhesive tape, or which can be adhered securely over an adhesive layer applied in a separate step around the pipe or pipe joint.

Another object is to provide novel procedures for preparing calendered heat shrinkable adhesive tapes, which procedures are simple, cost-effective and produce tapes possessing the adhesion and physical characteristics for protecting articles from the degradative environmental forces and stresses to which they are subjected in use.

BRIEF DESCRIPTION OF THE INVENTION

In accordance with the present invention, a heat shrinkable film is provided by the steps of:

(1) initially forming a film of polyolefinic material by depositing a mass of said material at the nip of the first and second rolls of a three-roll calender in which the second and third rolls rotate at about the same speed and the first roll rotates at a slower speed, the top roll is heated to a temperature above the melting point of the polyolefinic material, the middle roll is heated to an elevated temperature below its melting point, and the bottom roll is chilled relative thereto;

(2) extruding the polyolefinic mass between the first and second rolls to form a layer adhering to the surface of the second roll;

(3) transporting said film from the second roll around the third roll;

(4) transporting said film from said calender under tension, whereby to effect partial orientation in the machine direction and to maintain substantially all the molecular orientation imparted during calendering;

(5) subjecting one surface of said film to irradiation from a low energy electron beam at a voltage such that the radiation dose at the half-depth (half-thickness) of the film is approximately one half the dose at the irradiated surface and at a current to film surface speed ratio such that the surface dose would effect crosslinking sufficient to impart to said film a 100% modulus at 150° C. of from about 10 to about 100 pounds per square inch, if the dose at any depth in the film were substantially equal to said surface dose;

(6) cooling the irradiated film to below about 100° F.;

(7) subjecting the opposed surface of said film to said irradiation from a low energy beam at a voltage and at a current to speed ratio substantially equal to that in the preceding step, such that the 100% modulus at 150° C. of the film as a whole is about 10 to about 100 pounds per square inch and said film is characterized by being substantially uniformly crosslinked throughout its thickness;

(8) molecularly orientating by stretching said film in the machine direction (MD) at a temperature of about 90° C. to about 160° C. to provide a shrinkability of at least about 30 percent upon reheating under no constraints (i.e. stretching); and thereafter (9) cooling said film under tension to maintain said stretched condition.

In the preferred embodiment of this invention, a rubber-based adhesive is thereafter applied to form a tape.

DETAILED DESCRIPTION OF THE INVENTION

In order to prevent corrosion and/or other degradative forces from attacking pipelines, it is common practice to apply a protective cover to the surface of the pipe. While in its simplest form, this protective cover could be an anticorrosion coating, for optimum longevity, especially for inground pipelines, the protective system will at least consist of an outer film or adhesive tape which is typically spirally wound around the pipe. For reasons which will be apparent, such an outer wrap is generally referred to in the pipeline protection art as a "pipewrap".

In a typical anticorrosion system currently in use, a primer coating is first applied to the surface of the pipe and over this primer coating a pressure-sensitive tape having a tough, abrasion-resistant backing is then wound. In this typical pipeline laying system, sections of pipe of predetermined length, e.g. on the order of 40 feet, and having a pipewrap of the foregoing general description are assembled in the field for inground implantation.

If the end sections to be abutted and joined are so wrapped, these end sections are stripped of the protective wrap and then welded together. A protective wrap is then placed over this pipe joint and adjacent portions of the respective pipewraps in order to secure the weld or pipejoint, which can be said to be the weakest link in the pipeline and hence requires the most protection from environmental forces and stresses.

Whether it be the pipewrap extending along the length of the individual pipe sections or the wrap covering the joint between between adjacent pipe sections, it can be stated in general that the anticorrosion protective tapes that are applied to inground pipeline structures are often subjected to rather severe long-term shearing forces derived from the surrounding soil. The magnitude of these shearing forces depends on several factors, including among others: (a) the type of soil; (b) the tectonic forces surrounding the implanted pipeline; (c) the size of the pipe; (d) axial site emplacement; and (e) the range of thermal expansion as well as the pipe contents.

The result of the long-term shear forces on a pipeline protective coating is referred to as "soil stress". Soil stress on an anticorrosion protective coating generally results from the structural shear forces which cause the protective coating to creep along the pipeline peripheral surface. Creep is in essence a long-term visco-elastic or "cold flow" phenomenon common to all polymeric substances. The amount of creep will depend upon the physical properties of a coating. Since the physical properties, (i.e. modulus) of a coating will be temperature dependent, temperature becomes a decisive element in determining the amount of creep. At low temperatures, the propensity to creep will be substantially reduced, while at elevated temperatures, the likelihood of creep will be significantly increased, other factors remaining the same.

The prior art has addressed these problems with various chemical approaches directed to improving the cohesive nature of the adhesive, thereby increasing the resistance to shear and creep.

However, improvements in the chemistry of the adhesive system cannot be a total solution to the problems created by soil stress and creep. The physical characteristics and/or geometry of the pipewrap inherently provide areas of the pipe which are not adequately adhered to the tape. This is true even if the pipe surface is smooth and uniform.

When the tape is wound over the surface of the pipe, an overlap area is created where the thickness of this overlap area is equal to twice the thickness of the tape. The overlap runs a spiral path along the length of the pipe, and the presence of this spiral overlap poses three problems which may compromise the protective function of the tape over the pipe surface:

(1) the thickness differential projected at the surface of the overlap results in increased frictional resistance when the pipe moves against the soil and/or against any support skids, which high frictional resistance may result in a failure of the overlap bond and/or wrinkling of the tape, thereby ultimately permitting liquid to corrode and damage the pipe;

(2) the thickness differential at the underside (bottom) of the overlap results in the formation of an interstice at the termination of the lower adherent (tape wound around the pipe), which interstice running along the length of the pipe as a spiral is called the "spiral void", the presence of which eventually results in corrosion of the metal pipe; and (3) when the protective tape is subjected to the action of soil stresses and application tensions (residual stresses), the overlap bond is pulled apart; severe cleavage stresses are induced at the terminal points of the overlap when it is pulled apart in this fashion, causing a stress concentration on the overlap edges which may result in failure of the overlap bond.

The physical problems such as spiral void can in theory be substantially eliminated if the adhesive wrap could be adhered completely to the underlying substrate. However, this is not feasible with the wrapping operations which would normally be applied in the field.

The principles of shrink wraps, such as are commonly employed with thin films for packaging of foodstuffs, would theoretically provide a solution to this problem. However, no satisfactory method of applying the principles of heat shrinkable films to pipewraps has heretofore been known in the art.

As mentioned, from a chemical standpoint, the most effective anticorrosion coating system for resisting environmental forces such as soil stress utilizes a rubber-based adhesive and a polyolefinic outer wrap or adhesive backing.

A typical rubber-based adhesive for this purpose may, for example, include a blend of virgin butyl rubber, reclaimed butyl rubber and/or natural butyl rubber along with tackifiers, fillers and various other additives performing specific desired functions, e.g. antioxidants, bactericides, crosslinking agents, etc.

It may, for example, be a rubber-based adhesive such as is described in U.S. Pat. No. 4,268,334 issued to George M. Harris and Samuel J. Thomas or U.S. Pat. No. 4,472,231 issued to Robert F. Jenkins, both of which are assigned to the assignee of the instant invention.

Preferred backing materials are the polyolefins, particularly homopolymers or copolymers of ethylene, including blends of polyolefins with other polyolefins and/or other polymeric materials.

As previously stated, the present invention is directed to heat shrinkable films and tapes which are particularly useful in obviating the above-mentioned problems in protecting pipelines, particularly those which are subjected to the above noted inground environmental stresses. It will however be appreciated by those skilled in the art that these films and tapes will also find utility in other applications such as, for example, protective wraps for cables, wires, wire splices, and the like.

The present invention is also directed to novel processes for preparing heat shrinkable films and tapes, which processes lend themselves.

As previously stated in the "BRIEF DESCRIPTION OF THE INVENTION", in accordance with these novel procedures, a heat shrinkable film is provided by the steps of:

(1) initially forming a film of polyolefinic material by depositing a mass of said material at the nip of the first and second rolls of a three-roll calender in which the second and third rolls rotate at about the same speed and the first roll rotates at a slower speed, the top roll is heated to a temperature above the melting point of the polyolefinic material, the middle roll is heated to an elevated temperature below its melting point, and the bottom roll is chilled relative thereto;

(2) extruding the polyolefinic mass between the first and second rolls to form a layer adhering to the surface of the second roll;

(3) transporting said film from the second roll around the third roll;

(4) transporting said film from said calender under tension, whereby to effect partial orientation in the machine direction and to maintain substantially all the molecular orientation imparted during calendering;

(5) subjecting one surface of said film to irradiation from a low energy electron beam at a voltage such that the radiation dose at the half-depth of the film is approximately one-half the dose at the irradiated surface and at a current to film surface speed ratio such that the surface dose would effect crosslinking sufficient to impart to said film a 100% modulus at 150° C. of from about 10 to 100 pounds per square inch, if the dose at any depth in the film were substantially equal to said surface dose;

(6) cooling the irradiated film to below about 100° F.;

(7) subjecting the opposed surface of said film to said irradiation from a low energy beam at a voltage and at a current to speed ratio substantially equal to that in the preceding step (5), such that the 100% modulus at 150° C. of the film as a whole is from about 10 to about 100 pounds per square inch and said film is characterized as being substantially uniformly crosslinked throughout its thickness;

(8) molecularly orientating by stretching said film in the machine direction (MD) at a temperature of about 90° C. to about 160° C. to provide a shrinkability of at least about 25 percent upon reheating under no constraints; and thereafter (9) cooling said film under tension to maintain said stretched condition.

Each of the calendering, irradiation and orientation steps are critical in the practice of this invention.

With respect to the calendering step for first forming a film from a mass of polyolefinic material, it has been found to be essential that the film be formed initially on the described 3-roll calender, which calender is disclosed, for example, in the aforementioned U.S. Pat. No. 2,631,954. The reason for this criticality is not clearly understood, but it is believed to be due, at least in part, to the significant orientation which occurs as a function of the described calendering operation, and at least in part due to the physical properties of the film formed in this operation.

As was mentioned, the top (first) roll of the calender is heated above the melting point of the particular polyolefinic material employed to prepare the film. By way of illustration, with polyethylene a temperature of at least 270° F. would be utilized for this roll. The middle or second roll is heated to an elevated temperature below the melting point of the polymer, e.g. on the order of 190° F. for polyethylene. Preferably the heating of these two rolls is done internally. The third or bottom roll of the calender will be chilled relative thereto, e.g. to a surface temperature on the order of from about 50° to about 70° F.

Also as was stated above and in the aforementioned patent, the second and third rolls are rotated at about the same speed and the first roll is rotated at a slower speed. While the patent speaks of a speed ratio of the second to first roll of from 5:1 to 30:1, in accordance with the present invention, the speed will preferably be adjusted to a higher ratio, e.g. from about 10:1 to about 325:1.

Since the films of this invention should ideally have a thickness after orientation and stretching of on the order of 30–50 mils, it will be appreciated that the nip or gap between the rollers will be adjusted accordingly to provide a film which prior to orientation is appropriately thicker. As will be understood, the particular thickness will be dependent upon the amount of stretching needed and therefore is not susceptible to precise quantification. However, the desired thickness to be obtained in this calendering operation may be readily calculated by those skilled in the art by determining the delta (difference) in thickness before and after orientation and thus ascertaining the initial thickness needed to provide a film of a given thickness after stretching.

In operation, the desired gap is ascertained and a bank of the polyolefinic material is deposited between the nip of the first and second rollers. This mass of material is extruded between the two rollers to form a layer adherent to the surface of the second roller. It is then carried to the third roller where it is stripped from the second roller. It then passes around the third roller to a takeup roll. The resulting film is observed to have different surface characteristics. While the surface adhering to the second roll is smooth, the opposed surface is rougher and has a matte appearance. As is explained, for example, in Col. 4 of U.S. Pat. No. 2,631,954, the upper roll surface, advancing at less speed, causes drag on the material so that the upper surface of the sheet comes off the upper roll at a speed greater than the speed of the upper roll, causing the roughness as well as a difference in the degree of molecular orientation through the thickness of the sheet with an internal molecular orientation greater than the molecular orientation at the smooth surface. [While not wishing to be limited to any particular theory, it is believed that this difference in degree of molecular orientation may at least in part explain the superior results in terms of end product obtained with this specific calendering operation to form the film as distinguished from other means by which the film may be formed, e.g. extrusion, a different type of calender, etc.]

In any event, preparing the film in this manner has been found to provide a molecular orientation in the machine direction which, while significant, is not completely relaxable after the appropriate degree of crosslinking and will not provide a shrink film which, upon application of heat in known manner will shrink the desired amount in accordance with this invention, namely at least 25 percent under no constraint.

Another critical aspect of this invention is the crosslinking step necessary to impart dimensional stability to the film. While significant orientation will occur during the aforementioned calendering operation, the resulting film lacks the dimensional stability needed to provide a useful heat shrinkable film. For instance, while the orientation in this manner may provide an orientation substantially equivalent to stretching on the order of 100% to 400%, i.e. an elongation from 100 units of measure to about 400 units of measure, the resulting film will possess an elastic memory to impart shrinkability but will fall apart. Accordingly, it will be useless for its contemplated purpose. For this reason, crosslinking is required.

In accordance with this invention, the requisite crosslinking is obtained in what may be termed a two-stage process utilizing low energy radiation. Conceptually, it may be possible to use either neutral particles, charged particles, or electromagnetic radiation to effect the crosslinking. However, the preferred source is low energy electron beam (EB).

In the practice of this invention, the sum total of the crosslinking should provide a substantial depthwise uniformity in crosslinking in order to prevent tensile rupture in areas throughout the thickness of lesser crosslinking. In addition and as previously stated, the crosslinking must also address the inherent characteristics of a calendered film, namely extreme shrinkability and accordingly shrink the film in the longitudinal direction without producing wrinkles in the width direction. In other words the crosslinking method must achieve a balance between moderate longitudinal shrink and very little width expansion. The radiation to produce this uniform crosslinking is accomplished by irradiating first one surface of the film with low energy radiation and thereafter so irradiating the opposed surface, the sum total being sufficient to provide the uniform crosslinking and a hot modulus (at 150° C.) of from about 10 to about 100 psi, preferably about 15 to about 50 psi.

The modulus may be determined utilizing per se known instrumentation and techniques. One procedure, for instance, utilizes an Instron in which a piece of film, say, for example, 1"×4" is stretched to 8", held at the length for about one minute and the amount of force required to hold it at this distance is then calculated.

The radiation required to provide a given modulus within the recited range is not capable of precise quantification since it will be understood that it is dependent upon such variable factors as line speed through the irradiation source, film weight (grams per square meter), film composition, etc. However, the needed radiation may be readily calculated by the skilled practitioner, based upon dosage determined by routine experimentation within the expected judgment of the skilled worker having before him the foregoing description.

Once the dosage required to effect the required crosslinking on the film surface is determined, the treatment voltage for each side in the two-stage irradiation will be such that the midpoint of the thickness for each treatment will receive approximately 50% of the surface dose. In this manner, following the two-stage irradiation wherein each surface is irradiated, the middle portion of the film thickness will have received approximately the same dosage as each surface.

By way of illustration, to crosslink a polyolefinic film on the order of 30–50 mils thick and traveling at a line speed on the order of 30–40 feet per minute, a surface dose of on the order of 15–20 Mrads with a penetrating potential of on the order of 150–300 kilovolts and a dose current of on the order of 1.6 to 2.0 milliamps per inch width has been found effective to provide the desired modulus.

Since such radiation treatment provides a surface temperature of on the order of 180° F., it is not feasible to subject each film surface to irradiation simultaneously. Accordingly, after the initial surface irradiation, i.e. after irradiating the first film surface, the partially irradiated film must be allowed to cool, e.g. below 100° F. before irradiating the opposed surface.

To recapitulate, crosslinking is effected with low energy radiation in a two-stage system wherein in the first step, one surface is irradiated at a dosage sufficient to provide the desired crosslinking at the irradiated surface and about one-half the dosage required to obtain the same degree of crosslinking at the midpoint of the film thickness; and in the second step, the opposed surface is subjected to the same degree of radiation dosage so that the sum total of the two radiation stages provides about the same degree of crosslinking in the middle portion of the film thickness as on either surface.

The final step in the preparation of the heat shrinkable films of this invention is the molecular orientation or stretching in the machine direction necessary to impart the desired degree of shrinking upon application of heat to relax the film and thus allow the elastic memory to permit at least partial recovery of the film length.

For practical applications in the protection of pipelines, the film should have the capability of shrinking at least 25% and, most preferably, on the order of 30 to 50%. However, as previously mentioned the film has received an initial orientation during the calendering operation. For example, it may, after calendering, have the capability of shrinking, say, from 100 units to 85 units with a corresponding increase in width (cross direction) of from, say, 100 units to 106 units. In this hypothetical, a further machine direction stretching of 100 to 125 units at substantially constant width would be required to provide a film capable of shrinking 32% upon heating, i.e. from 100 units to 68 units.

Orientation to effect stretching may be accomplished in per se known manner by heating to soften, e.g. to a temperature on the order of 90° C. to 160° C. and then applying the required amount of tension in the machine direction to cause the desired elongation. While maintaining this tension, the film is then cooled down to prevent recovery. The tension is then released.

To prepare a heat shrinkable tape, a suitable adhesive may then be applied on one surface, e.g. by extrusion coating or other known coating techniques. Preferably, a low temperature adhesive will be employed to minimize relaxation of the orientation during the coating step for applying the adhesive to the shrinkable film backing.

The particular materials which may be selected in the practice of this invention may be any of those heretofore known in the art for preparing heat shrinkable films and pipewraps. Accordingly, this selection per se comprises no part of the present invention and may, to a degree, be a matter of individual whim.

By way of illustration, however, the polyolefinic materials which may be employed are in general characterized as being heat shrinkable (or heat recoverable, as they are sometimes referred to in the art) materials having the properties of elastic memory imparted to them by the crosslinking and orientation. The preferred materials are the polyethylenes, e.g. low density polyethylene (LDPE), medium density polyethylene (MDPE), high density polyethylene (HDPE), very low or ultra low density polyethylene (VLDPE), and linear low density polyethylene (LLDPE), including blends thereof.

As examples of other useful polymers which may be used alone or in combination with polyethylene, mention may be made of ethylene vinyl acetate copolymers, ethylene propylene rubber, EPDM, polypropylene, polyvinyl chloride, polyisobutylene, conjugated diene butyl, butyl rubber, etc.

The polyolefinic materials may, if desired, be blended to form a mixture of polymers along with other reagents performing specific desired functions for the film, e.g. a colorant such as carbon black. This blending may be done, for instance, in a 2-roll mill and the resulting blend, in its heated condition, may then be transported to the calendering operation.

In like manner, the particular adhesives employed may be selected from those heretofore employed in protective pipewraps, e.g. rubber-based adhesives such as those heretofore mentioned, asphaltrubber adhesives, and the like. Since the adhesives which may be utilized in the practice of this invention may be any of those per se known and used in the adhesive tape art, e.g. the protective pipewrap art, the selection of the particular adhesive may be considered to be a matter of individual choice and per se comprises no part of this invention. In like manner, the particular adhesive thickness as well as the manner of application to the heat shrinkable film will be a matter of choice within the expected judgment of the skilled worker.

In general, thicknesses on the order of 30–40 mils are considered to be typical, although greater or lesser thicknesses are contemplated where found desirable or expedient to do so.

While casting, extrusion coating and the like may be utilized, calendering has been found to be a particularly efficacious method for applying the adhesive from a manufacturing standpoint.

While the preferred form of this invention is directed to heat shrinkable adhesive tapes, it is to be expressly understood that heat shrinkable films prepared by this invention are also highly useful. As is known, for example, a layer of a suitable adhesive, e.g. a rubber-asphalt adhesive layer on the order of 60 mils thick may first be applied to a metal pipe and the heat shrinkable film then spirally wound thereover to provide a protective wrap.

The following examples show by way of illustration and not by way of limitation the practice of this invention.

EXAMPLE 1

Low Density Polyethylene (LDPE) Film 99 parts by weight of low density polyethylene (melt index, 2.0 and specific gravity 0.920) and one part by weight of carbon black pigment along with 500 parts per million of an antioxidant of the thiobisphenol type were milled together and then calendered on a three-roll mill as previously described in which the second roll was rotated at a surface speed of about 27 feet per minute (fpm) and had a surface temperature of about 160° F.; the first roll rotated at a speed of about 2 fpm and had a surface temperature of about 420° F.; and the third roll rotated at about the same speed as the second roll and had a surface temperature of about 65° F., to provide a film approximately 36 mils thick and having an areal density of 849 grams per square meter ($g/m^2$). When heated to 300° F. for any length of time, the resulting film will shrink about 70% in the axial (machine) direction and expand 50% in the transverse (cross) direction and 100% in thickness. However, the film has no strength at 150° C. and accordingly is not useful as a shrink wrap.

EXAMPLE 2

LDPE/EVA Copolymer Film 62.5 parts by weight of the low density polyethylene recited in Example 1, 35 parts by weight of a copolymer of ethylene and vinyl acetate containing 17% vinyl acetate (melt index, 1.8, specific gravity 0.937) and 2.5 parts by weight of carbon black along with 520 ppm of the antioxidant described in Example 1 were milled together and then calendered on a three-roll calender as in the preceding example, except that the first roll had a surface temperature of about 415° F. The resulting film was approximately 34 mils thick and possessed an areal density of 796 g/m². When heated to 300° F. for any length of time, the film shrunk about 65% in the axial direction and expanded about 45% in the transverse direction and about 138% in thickness. However, as in Example 1, it had no strength at 150° C. and accordingly was not useful as a shrink wrap.

The following two examples show by way of illustration the mental processes one may follow, if needed, to ascertain the proper irradiation conditions to be followed in accordance with the foregoing description.

EXAMPLE 3

From standard curves for beam penetration as a function of electron beam voltage and areal density, it can easily be calculated that at 250 kV a bilateral irradiation of an 849 g/m² film (e.g. as prepared in Example 1) will produce a dose at the midline roughly 70% of the surface dose. A sheet of the film as prepared in Example 1 was irradiated on one surface at 250 kV on an Energy Sciences Electrocurtain at 30 fpm at five current densities ranging from 0.75 to 1.75 milliamps per inch. The nominal doses ranged from 9 to 21 MRad. The film was then cooled below 100° F. and the opposed surface of the film was then irradiated under the same processing conditions. The resulting sheets of film were tested for 100% modulus at 150° C. and were found to exhibit an approximately linear variation of modulus with nominal dose given by:

$$M^{100}(150° C.) = -10 + 1.5R$$

where $M^{100}$ (150° C.) is the 100% modulus at 150° C. in psi; and R is the nominal dose in MRad.

Thus, for an $M^{100}$ (150° C.) of 20 psi, a dose of 20 Mrad is predicted. From data developed, such a sheet would have a 150° C. shrink force of 2 oz/in, an axial shrinkage of 14%, a transverse expansion of 8% and a thickness expansion of 9%. Such a film will find utility as a shrink film, but does not have sufficient shrink force or axial shrinkability to be useful as a shrink wrap for pipes and the like as contemplated by this invention.

EXAMPLE 4

From standard curves for beam penetration as a function of electron beam voltage and areal density, it is calculated that at 250 kV a bilateral irradiation of a 796 g/m² film (e.g. as prepared in Example 2) will produce a dose at the midline roughly 85% of the surface dose. A sheet of film as prepared in Example 2 was irradiated on one surface at 250 kV on an Energy Sciences Electrocurtain at 30 fpm and at five current densities from 0.75 to 1.75 milliamps per inch. The nominal doses ranged from 9 to 21 MRad. The resulting sheets of film were tested for 100% modulus at 150° C. and were found to exhibit an approximately linear variation of modulus with nominal dose given by:

$$M^{100} (150° C.) = -10.3 + 1.8 R.$$

Thus, for an $M^{100}$ (150° C.) of 20 psi, a dose of 16.5 MRad is predicted. From data developed, such a sheet of film would have a 150° C. shrink force of 2 oz/in, an axial shrinkage of 17%, a transverse expansion of 6% and a thickness expansion of 12%. As in the preceding example, this film will find usefulness as a shrinkable film from the standpoint of modulus, but again does not have sufficient shrink force or axial shrinkability to render it useful as a shrinkwrap for pipes as envisioned by the primary objective of this invention.

In the previous two examples, it will be seen that the resulting shrinkable films will not provide the requisite shrinkability upon orientation, i.e. a shrinkability of at least 30% upon reheating under no constraints. From the data generated and the observations learned, the following examples show by way of illustration the preparation of heat shrinkable wraps in accordance with the primary objectives of this invention.

EXAMPLE 5

A sheet of film as prepared in Example 1 is irradiated on one surface while traveling beneath the Electrocurtain low energy electron beam at 35 fpm, the irradiation being at 270 kV and 1.9 milliamps/in. The nominal dose was calculated at 19 MRad. The film was then cooled below 100° F. and the opposed surface was subjected to the same dosage. The dose at the sheet midline was now calculated to be roughly equal to the surface dose. The irradiated surface of the sheet reached a temperature over 180° F. during each pass and emerged from the processor at about 140° F. When wrapped in the roll the sheet temperature is between 90° and 100° F. and it was allowed to cool before irradiating the opposed surface. The value of $M^{100}$ (150° C.) was measured at 25.7 psi, the shrinkage force at 3 oz/in, the axial shrinkage at 21%, and the transverse expansion at 9%. The modulus, $M^{100}$ (150° C), is higher because of the greater average dose, but the greater axial shrinkage is a result of the inevitable stretching occurring in pulling the hot sheet through the electron beam processor. It is to be noted, however, that absent the further orientation step which follows, the shrink force and axial shrinkage are still not high enough for the contemplated usage as a shrink wrap for metal pipes or other tubular articles.

EXAMPLE 6

The irradiated sheet as prepared in Example 5 was subjected to a post drawing operation which is less drastic and easier to control from a manufacturing standpoint than the postdrawing (stretching) operations common to prior commercial production of shrinkable films. The sheet was run from a slow roll to a fast roll both running at a surface temperature of about 250° F. and a speed ratio of 1.33 and then cooled under tension. The differentially driven rolls were spaced less than 0.1 inch apart with the sheet S-wrapped over the rolls. The sheet loses 30% in thickness and 4% in width. The desired draw ratio was calculated from the following equation:

$$1 - \frac{l/l_o}{D} = S$$

where S is the desired axial shrinkage for a shrink wrap; and l/lo is the axial ratio of crosslinked calendered sheet before drawing, i.e. 1-$S_o$, where $S_o$ is the axial shrinkage before drawing. In the instant example, the desired value of S=40%, l/lo is 0.79. Accordingly, D should be 1.32. In this example, with D=1.33 and l/lo=0.79, the predicted value of S=40.6%. The measured value was 40.8% with a transverse expansion of 15%, a thickness increase of 54%, and a shrink force of 9 oz/in.

EXAMPLE 7

To prepare a heat shrinkable adhesive tape, the shrinkable film as prepared in Example 6 was laminated to a rubber-based adhesive at a temperature below the melting point of the LPDE film in a calender while maintaining a tension on the film sufficient to overcome any axial shrinkage. The adhesive was formulated with regard to the available shrink force of the sheet at 150° C. so that the forces exerted against constraints by the shrinkage of the film will force the adhesive into voids, crevices and the like during shrinkage on a pipe.

EXAMPLE 8

The film prepared in Example 2 was bilaterally irradiated in the manner described in Example 5 at 50 fpm, 260 kV and 2.1 milliamps/in. The nominal dose was calculated at 14.5 MRad. The dose at the sheet midline was now calculated to be roughly equal to the surface dose. The irradiated surface of the sheet reached a temperature of 170° F. during each pass and emerged from the processor at about 130° F. When wrapped in the roll, the sheet temperature was between about 100° and about 110° F. and it was allowed to cool before subjecting the opposed surface to irradiation. The $M^{100}$ (150° C.) was measured at 23.1 psi, the shrinkage force at 3 oz/in, the axial shrinkage at 18%, and the transverse expansion at 8%. The modulus as in Example 5 was again higher than predicted because of the greater average dose, but the greater axial shrinkage was due to the inevitable stretching occurring in pulling the hot sheet through the electron beam processor. The shrink force and axial shrinkage (as in Example 5) were still not high enough for the contemplated usage as a shrink wrap without the further orientation step which follows.

EXAMPLE 9

The irradiated sheet as prepared in Example 8 was subjected to a post drawing operation in the manner described in Example 6, except that the speed ratio of the rolls was 1.30. The sheet lost about 22% in thickness and 2% in width. With respect to the equation as described in Example 6, in the instant example the desired value of S was 38%, L/Lo was 0.82, and D should accordingly be 1.32. In this example with D=1.30, and L/$L_o$=0.82, the predicted value of S is 36.9. The measured value was 36.6 with a transverse expansion of 9%, a thickness increase of 41%, and a shrink force of 5 oz/in.

EXAMPLE 10

A heat shrinkable adhesive tape was prepared from the shrinkable film of Example 9 according to the procedures described in Example 7.

From the foregoing description and illustrative examples it will thus be seen that the present invention provides an elegant procedure for the manufacture of heat shrinkable films and tapes which find particular utility as protective wraps for metal pipes and other tubular articles.

More specifically, the present invention is characterized by great efficiency, the use of very high surface dose rates and speed of manufacture without melting of the film or relaxing the inherent orientation. The calendering step of film manufacture, which as previously stated is a critical aspect of this invention, imparts about one-half of the eventual orientation which in turn permits the production of thinner sheets which can be irradiated faster with safer and less expensive irradiation. The stretching is simpler and faster, less draw is required (e.g. 30% vs. the usual 80-500% common to prior procedures) which in turn means less cross direction expansion on shrinking. No post stretching annealing is required. The opposed surfaces can be differentially treated where found desirable or expedient to do so. For example, one surface could be treated for release while the opposed surface to which the adhesive layer is to be applied could be treated to increase adhesion. It is also postulated that the surfaces could be treated at different levels to cause the film to curl as it is shrunk. Moreover, conceptually the film interior could be less crosslinked to provide more stress relaxation, if desired.

It will be appreciated that various changes may be made without departing from the invention described in the foregoing specification. For example, for purposes of illustration reference has been made to passing the film in the path of irradiation at a line speed of from about 30-40 feet per minute. However, it is visualized that line speeds on the order of about 10 to about 500 feet per minute may be employed. In like manner, while reference has been made to a surface dose of from about 15-20 Mrads with a penetrating potential of from about 150-300 kilovolts and a dose current of from about 1.6 to about 2.0 milliamps per inch width, generally speaking it is contemplated that one may employ a surface dose of from about 4 to about 20 Mrads with a penetrating potential of from about 150 to about 550 kilovolts and a dose current of from about 0.4 to about 6.0 milliamps per inch width of film to obtain the desired crosslinking.

Since certain changes may be made without departing from the scope of the invention herein involved, it is intended that all matter described in the foregoing specification, including the examples, shall be interpreted as illustrative and not in a limiting sense.

What is claimed is:

1. A process for preparing a heat shrinkable film comprising steps of:
   (1) depositing a mass of polyolefinic material at the nip of the first and second rolls of three-roll calender in which the second and third rolls rotate at approximately the same speed and the first roll rotates at a slower speed, said first roll being heated to a temperature above the melting point of said polyolefinic material, said second roll is heated to an elevated temperature below the melting point of said polyolefinic material, and said third roll is chilled relative thereto;
   (2) extruding said mass of polyolefinic material between said first and second rolls to form a film adhering to the surface of said second roll;
   (3) transporting said film from said second roll around said third roll;

(4) transporting said film from said third roll of said calender under tension, whereby to effect partial orientation of said film in the machine direction and to maintain substantially all the molecular orientation imparted to said film during said calendering steps;

(5) passing said film in the path of irradiation from a low energy electron beam while subjecting one surface of said film to said irradiation at voltage such that the radiation dose at the half-depth of said film is approximately one-half the dose at said irradiated surface and at a current to film surface speed ratio such that the surface dose would effect crosslinking sufficient to impart to said film a 100% modulus at 150° C. of from about 10 to about 100 pounds per square inch if the dose at any depth in the film were substantially equal to said surface dose;

(6) passing said film in the path of irradiation from a low energy electron beam while subjecting the opposed surface of said film to said irradiation at a voltage and at a current to speed ratio substantially equal to that in the irradiation of said one surface, such that the 100% at 150° C. of said film as a whole is from about 10 to about 100 pounds per square inch and said film is characterized as being substantially uniformly crosslinked throughout its thickness, thereby achieving a balance between moderate longitudinal shrink and very little width expansion; and (7) molecularly orientating said film by stretching in the machine direction to provide a shrinkability of at least 25 percent upon heating said film in an absence of constraints;

(8) applying a layer of adhesive to said film, whereby to form a heat shrinkable adhesive tape.

2. A process as defined in claim 1 wherein the speed ratio of rotation of said second roll to said first roll of said three-roll calender is from about 10:1 to about 325:1.

3. A process as defined in claim 1 wherein said first roll is heated to a temperature of at least 270° F.

4. A process as defined in claim 3 wherein said third roll is maintained at a temperature of from about 50° to about 70° F.

5. A process as defined in claim 1 wherein said film coming off said roll is characterized in that the surface adhering to said second roll is smooth, the opposed surface of said film is rougher and has a matte appearance, and said film is further characterized in that the internal molecular orientation of said film formed by said calendering steps is greater than the molecular orientation at said smooth surface of said film.

6. A process as defined in claim 1 wherein said polyolefinic material comprises polyethylene.

7. A process as defined in claim 6 wherein said polyethylene is a low density polyethylene.

8. A process as defined in claim 1 wherein said polyolefinic material comprises a copolymer of polyethylene and ethyl vinyl acetate.

9. A process as defined in claim 1 wherein said film prepared by said calendering steps is from about 30 to about 50 mils thick.

10. A process as defined in claim 9 wherein the line speed of said film passing in the path of irradiation for each said surface irradiation step is from about 10 to about 500 feet per minute.

11. A process as defined in claim 10 wherein each said surface dose is from about 4 to about 20 Mrads with a penetrating potential of from about 150 to about 550 kilovolts and a dose current of from about 0.4 to about 6.0 milliamps per inch width of said film.

12. A process as defined in claim 1 wherein said molecular orientation step is performed while said film is at a temperature where it is softened.

13. A process as defined in claim 12 wherein said temperature is from about 90° C. to about 160° C.

14. A process defined in claim 1 wherein said adhesive comprises a rubber based adhesive and said tape is adapted for use as a protective wrap for metal pipes.

15. A process for preparing a heat shrinkable film comprising steps of:

(1) depositing a mass of polyolefinic material at the nip of the first and second rolls of three-roll calender in which the second and third rolls rotate at approximately the same speed and the first roll rotates at a slower speed, the ratio of rotation of said second roll to said first roll being from about 10:1 to about 325:1, said first roll being heated to a temperature of at least 270° F., said temperature being above the melting point of said polyolefinic material, said second roll is heated to an elevated temperature below the melting point of said polyolefinic material, and said third roll is at a temperature of from about 50° to about 70° F.;

(2) extruding said mass of polyolefinic material between said first and second rolls to form a film adhering to the surface of said second roll;

(3) transporting said film from said second roll around said third roll;

(4) transporting said film from said third roll of said calender under tension, whereby to effect partial orientation of said film in the machine direction and to maintain substantially all the molecular orientation imparted to said film during said calendering steps;

(5) passing said film in the path of irradiation from a low energy electron beam while subjecting one surface of said film to said irradiation at voltage such that the radiation dose at the half-depth of said film is approximately one-half the dose at said irradiated surface and at a current to film surface speed ratio such that the surface dose would effect crosslinking sufficient to impart to said film a 100% modulus at 150° C. of from about 10 to about 100 pounds per square inch if the dose at any depth in the film were substantially equal to said surface dose;

(6) passing said film in the path of irradiation from a low energy electron beam while subjecting one surface of said film to said irradiation at voltage and at a current to speed ratio substantially equal to that in the irradiation of said one surface, such that the 100% at 150° C. of said film as a whole is from about 10 to about 100 pounds per square inch and said film is characterized as being substantially uniformly crosslinked throughout its thickness, thereby achieving a balance between moderate longitudinal shrink and very little width expansion; and (7) molecularly orientating said film by stretching in the machine direction while said film is at an elevated temperature in which it is in a softened state to provide a shrinkability of at least 25 percent upon heating said film in an absence of constraints;

(8) applying a layer of adhesive to said film, whereby to form a heat shrinkable adhesive tape.

16. A process as defined in claim 15 including the step of cooling said film to a temperature no higher than about 100° F. before subjecting said opposed surface to said irradiation.

17. A process as defined in claim 16 wherein each said surface dose is from about 4 to about 20 Mrads with a penetrating potential of from about 150 to about 550 kilovolts and a dose current of from about 0.4 to about 6.0 milliamps per inch width of said film.

* * * * *